United States Patent [19]

Soroka et al.

[11] Patent Number: 4,710,606
[45] Date of Patent: Dec. 1, 1987

[54] TWO-AXIS OPTIC WRIST FOR LASER APPLICATIONS

[75] Inventors: Daniel P. Soroka, Imperial; Roger L. Swensrud, Plum Borough; Joseph J. Zelezniak, Upper St. Clair Twp., Allegheny County, all of Pa.

[73] Assignee: Westinghouse Electric Corp., Pittsburgh, Pa.

[21] Appl. No.: 867,859

[22] Filed: May 28, 1986

[51] Int. Cl.$^4$ .............................................. B23K 26/08
[52] U.S. Cl. ....................... 219/121 LU; 219/121 LQ
[58] Field of Search ................. 219/121 LU, 121 LV, 219/121 LQ, 121 LW

[56] References Cited

U.S. PATENT DOCUMENTS

| 3,986,767 | 10/1976 | Rexer et al. | 219/212 LV X |
|---|---|---|---|
| 4,413,180 | 11/1983 | Libby | 219/121 LV X |
| 4,458,168 | 7/1984 | Welburn | 310/185 |
| 4,461,947 | 7/1984 | Ward | 219/121 LU X |
| 4,501,980 | 2/1985 | Welburn | 310/12 |
| 4,539,462 | 9/1985 | Plankenhorn | 216/121 LV |

FOREIGN PATENT DOCUMENTS

| 0021491 | 2/1984 | Japan | 219/121 LQ |
|---|---|---|---|
| 2131388 | 6/1984 | United Kingdom . | |

Primary Examiner—C. L. Albritton
Attorney, Agent, or Firm—B. R. Studebaker

[57] ABSTRACT

A two-axis optical wrist which can be used in combination with an industrial manipulator having associated therewith a laser beam delivery system. The two-axis optical wrist for laser application provides two additional degrees of freedom which in combination with a three-axis industrial manipulator provides the five degrees of freedom necessary for industrial material processing laser systems to position a laser beam anywhere within the work envelope of an industrial manipulator.

2 Claims, 4 Drawing Figures

TWO-AXIS OPTIC WRIST FOR LASER APPLICATIONS

BACKGROUND OF THE INVENTION

1. Field of the Invention

The present invention generally relates to an optical system for the delivery of a collimated beam of light in conjunction with an industrial manipulator. More particularly, the invention provides a two axis optical wrist for use in combination with a robotic laser beam delivery apparatus.

2. Description of the Prior Art

High powered lasers are ideally suited for use as a source of heat in various metal processing applications which include the vaporization of materials, such as in drilling and cutting operations. Lasers are also applicable to procedures, such as, welding or surface cladding of materials, which require the melting of materials. Also, the temperature of solid phase materials can be varied, by use of the laser in hardening and annealing operations.

The thermal effects which are experienced by materials when exposed to the laser beam are primarily dependent on the intensity of laser energy, the absorptivity and reflectivity of the material and the length of time during which the material is exposed to the laser beam. Precise control over these parameters determines the resulting change in the phase or the state of the material. Usually, when lasers are employed in processes such as welding, cutting and surface treatment, the area of the workpiece to be processed is oriented in such a way that it is nearly normal to the laser beam with the beam impinging squarely on its surface. This configuration optimizes the absorptivity of the material and facilitates its heating. Generally, the laser and the workpiece are cause to move relative to each other. This relative motion can be accomplished in two ways. First, the beam can be traversed over a stationary workpiece. Second, the workpiece can be manipulated under a fixed laser beam. The former method requires that the laser beam be moved either by mounting the laser on a movable device or by directing the beam from a fixed laser to the workpiece through the use of a movable optical system. The latter method requires the use of a workpiece manipulating device.

Generally, the latter method is employed. Most present systems which use the laser for material processing employ a fixed laser beam along with the apparatus that is capable of manipulating the workpiece. This manipulation of the workpiece usually incorporates linear or rotational movement of the part and exploitation of the part's symmetry. Symmetrical or simple parts can be processed by machines having one or two axes of freedom, but any moderately complex workpiece requires a part manipulating apparatus which has the capability of providing four or five degrees of freedom. The required manipulations of such workpieces, along with the general requirement that the laser beam impinge the work surface normally, are difficult to achieve with currently available part handling devices. Furthermore, these devices are usually made for specific parts and have dedicated hardware. Therefore, they are not readily retooled when changes in part shape and dimension occur. Other disadvantages of this type of equipment are that large, cumbersome parts are difficult to position accurately and repeatedly and have significant inertial effects when moved. Also, due to part geometry, obstructions may occur which prevent a clear "line of sight" between the laser beam source and the working surface of the workpiece.

A significant contribution to the resolution of the aforedescribed problem has been contributed by Daniel J. Plankenhorn in U.S. Pat. No. 4,539,462, entitled "Robotic Laser Beam Delivery Apparatus". This patent is assigned to the assignee of the present invention and incorporated herein by reference as it fully set forth. In this patent, a light beam directing apparatus is described which permits a reflected beam of light such as a laser, to be directed in a path which comprises a plurality of straight segments. Each segment of the beam is associated with a segment of the robot's arm in a fixed spatial relationship. The laser beam delivery system provides optical joints which are used in conjunction with an industrial manipulator so that the axes of motion of both are synchronous and incapable of mutual interference.

The laser beam delivery system is ideally suited for use with a general purpose orthogonal axis manipulator system which is taught in U.S. Pat. No. 4,571,149 to Soroka et al. This patent teaches an orthogonal axis manipulator system which is commercially available as the Unimate 6000 Series from Westinghouse Electric Corporation. This patent is also incorporated herein by reference as if fully set forth. By definition and solid analytic geometry, in a rectangular-coordinant system, all points in space can be reached at any rectangular orientation through six degrees of freedom. These six degrees consist of three translations usually referred to as X, Y, and Z axes and three rotation $\theta_X$, $\theta_Y$, and $\theta_Z$. Many machine tools and robots use only five degrees of freedom with the sixth degree, $\theta_Z$, eliminated since its motion is end effector rotation about itself and would be better accomplished by other mechanical designs such as a spindle.

As should be evident from the earlier discussion, these five degrees of freedom or motion are thus also what is required in an industrial material processing laser system in order to move the beam to do useful work. Obviously, depending upon the robot's geometry, there are a variety of reproaches to fitting the required laser beam optics to a given industrial manipulator.

A variety of optical wrists or optical head configurations have been suggested in the literature to provide the necessary degrees of freedom for useful laserrobotic applications. An example of which can be found in the Plankenhorn patent identified above in which optical joints comprise tubular members and are rotatably connected to each other but are not necessarily automatically driven in a relative rotational direction during the operation of the robot. A similar optical head or wrist is shown in U.K. Patent Application No. 2,131,388A to David et al. Attempts have been made to motorize such optical wrists or optical focussing devices and an example of this is found in U.S. Pat. No. 3,986,767 to Rexer et al. entitled "Optical Focus Device". This patent teaches an apparatus for focussing a beam of collimated radiation by the use of a focus head having an off-axis parabolic section in combination with a flat turning mirror. The head is capable of rotating the beam about two orthogonal axes and is mounted in a gantry which permits three-dimensional movement of the entire head. The rotation of the head is effected by means of a gear train and drive motor associated with each degree of freedom. The use of such a system to effect the movement of the optical head provides the obvious problem of gear backlash as well as the inaccuracies consistent with such a structure. The use of a hollow shaft motor has been suggested in U.S. Pat. No. 4,413,180 for a device used in image acquisition. The motor itself in such a system drives an optical beam appointing and spreading assembly comprising a fixed cylindrical reflector having a concave, light reflecting inner surface.

It is an object of this invention to provide a simplified optical wrist for use with laser beam delivery equipment.

It is also an object of this invention to provide an optical wrist for laser applications in which the laser beam lies on the central line of the rotational axes of the optical wrist.

It is still another object of this invention to provide in combination with an industrial manipulator having a laser beam delivery system integral therewith, a two-axis optical wrist for laser applications.

SUMMARY OF THE INVENTION

The invention provides a two-axis optical wrist for use in combination with a laser beam delivery system. The optical wrist of this invention includes a mounting bracket, first and second mirror housings, a first and second motor, and a laser beam focussing assembly. The mounting bracket has an aperture therethrough including means for removably securing the mounting bracket to the terminal end of a laser beam delivery system and through which aperture the laser beam passes. The first and second mirror housings have a first mounting face with an aperture therethrough and a second mounting face with an aperture therethrough perpendicular to the first mounting face. The housing defines therein a chamber in open communication through the first and second mounting face apertures and a reflective surface is disposed within the chamber. A first and second motor means each having an inner stator, an outer stator and an annular rotor which is coaxially positioned between the inner and outer stators about an axis of revolution are also provided. The axis of motion of the motor means is coincident with the beam being conveyed therethrough. The first motor means defines a conduit through which the beam passes. The inner and outer stator means are in a mechanically fixed association with the mounting bracket and the rotor means is in a mechanically fixed relationship with the first mirror housing first mounting face. The second motor means defines a conduit through which the beam passes, the inner and outer stators thereof being in mechanically fixed association with the first mirror housing second face. The second motor means rotor is in fixed mechanical association with the second mirror housing first mounting face. The laser beam focussing assembly is removably mounted on the second mirror housing second face.

Rotational movement of either motor means about its axis of motion causes the beam reflected by the reflective surface of the mirror housing associated with that particular rotor to pass at an angle of 90° to the originating beam in order to describe a generally flat surface to which the axis of rotation of that particular rotor is perpendicular.

BRIEF DESCRIPTION OF THE DRAWINGS

The above as well as other features and advantages of the present invention can be more clearly appreciated through consideration of the detailed description of the invention in conjunction with the several figures in which.

DETAILED DESCRIPTION OF THE INVENTION

This invention provides a two-axis optical wrist adapted for use with a robotic laser beam delivery system. When used with an orthogonal axis manipulator system such as the Unimate 6000 Series gantry-type robot, this optical wrist provides an additional two degrees of freedom so that all points in space within the work envelope of the manipulator can be reached. Thus, the three degrees of freedom provided by the orthogonal axis manipulator and the two degrees of freedom provided by the optical wrist of this invention permit an industrial material processing laser system to move a laser beam to do useful work within the envelope of the manipulator.

Figure 1:
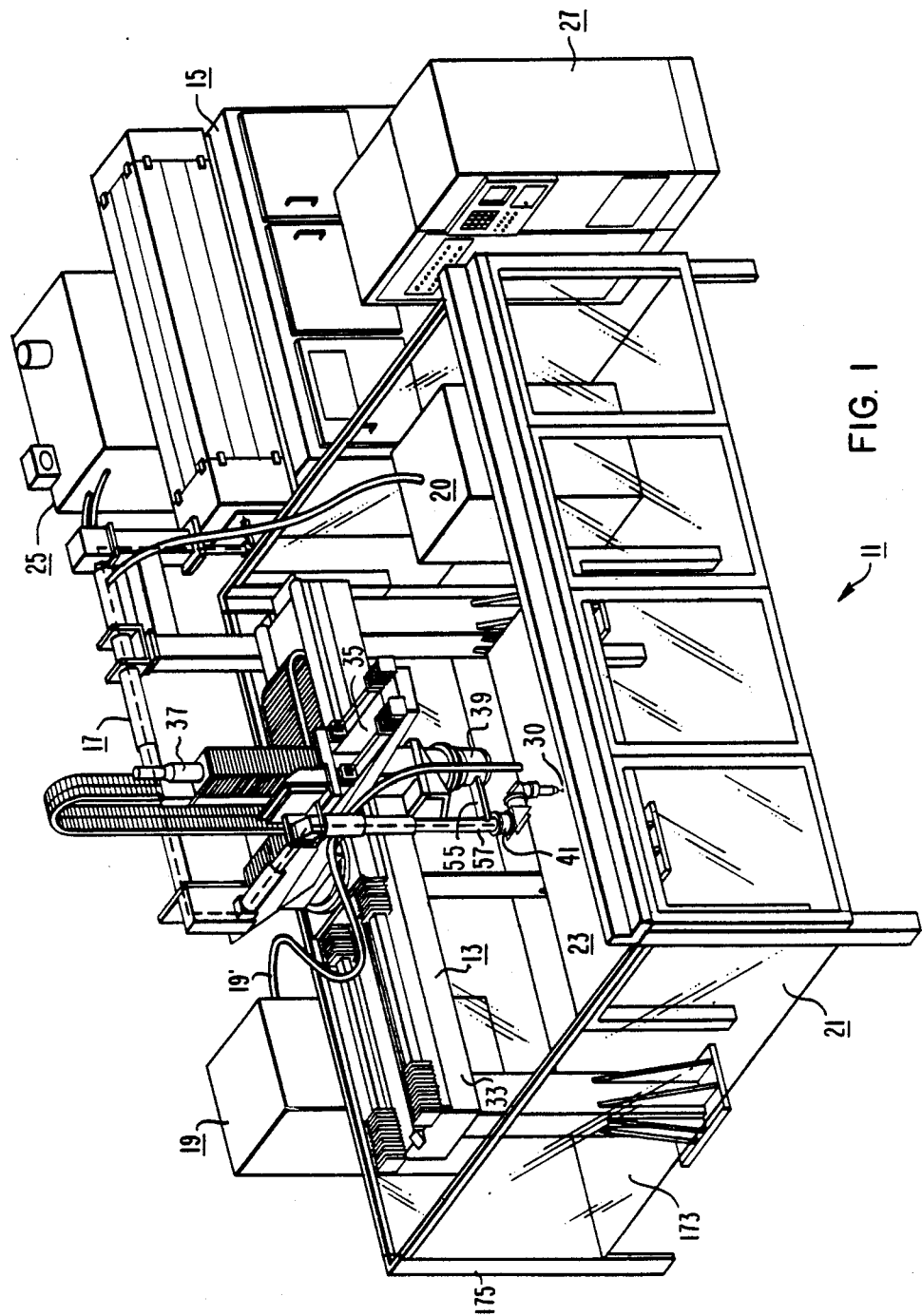
FIG. 1 is an isometric view of an orthogonal axis manipulator system incorporating a laser beam delivery system and the unique two-axis optical wrist of this invention.

A complete integrated robot laser work cell is isometrically presented in FIG. 1 and generally indicated by the reference character 11. The robot laser system 11 includes an orthogonal axis manipulator system 13 to which is coupled a laser 15 by means of a laser beam delivery system 17. The system 11 also includes an exhaust system 19, a safety enclosure means 21 and a precision table or similar type fixture as at 23. A coolant chiller for the optics used in the laser beam delivery system is shown at 25. A programmable controller by which the orthogonal axis manipulator is directed is shown at 27. The manipulator system 13 comprises three orthogonal axis assemblies consisting of the X-axis assembly 33, the Y-axis assembly 35, and the Z-axis assembly 37. A wrist mechanism or similar supporting structure 39 is mechanically coupled to the Z-axis assembly 37 to provide the support necessary for the optical wrist 41 of this invention. The optical wrist will be described in detail hereinafter. The optical wrist is coupled to the laser beam delivery system 17 in order to provide an integrated laser beam delivery system for effective use within the work envelope of the manipulator 13. The laser beam delivery system used with this robot comprises in its simplest form a series of joints which are attached to a support member or arm defining one axis of movement of the robot system 13. The laser beam delivery system permits a reflected beam of light such as a laser to be directed in a path which comprises a plurality of straight segments. Each segment of the beam is associated with a segment of the robot's axis in a fixed spatial relationship.

The work cell of FIG. 1 is shown to include an Everlast EFA 51 $CO_2$ laser manufactured by Coherent, Inc. However, since laser selection is highly application dependent, it should be recognized that any one of a number of lasers can be utilized in such a system and that the optical wrist 41 of this invention can be utilized in such various selections. Additionally, the work cell shown in FIG. 1 utilizes an air filtration drying and recirculating system shown at 20. A suitable system is commercially available in Balstrom filter products "Air Dryer Model 75". The exhaust system 19 includes a conduit system 19' which terminates proximate the laser beam delivery point 30 of the manipulator 13. It should be appreciated that due to the generic material processing nature of such a system as described herein, some materials will emit toxic fumes during laser processes. Additionally, this exhaust system 19 provides a pick-up nozzle disposed proximate the optical wrist and directed toward the source of the fumes. Means are also provided in association with the pick-up nozzle of the hose 19' to generate the negative pressure necessary to draw the fumes from the work area for ultimate discharge and/or filtration.

The work cell illustrated in FIG. 1 also includes a plexiglass enclosure surrounding the working envelope in order to provide a substantial margin of safety. The plexiglass enclosure, due to the characteristics of plexiglass, will serve a multiplicity of purposes. For example, as plexiglass is hit by a 10.6 micron $CO_2$ laser, smoke is emitted prior to burn-through and serves as an early warning signal to any individuals proximate the work cell. Additionally, plexiglass allows the operator to view the system operation without the increased risk of harm and serves as a line of defense against unauthorized personnel entering the work envelope. These plexiglass panels are generally indicated by the reference characters 173 and are supported by the framework members 175.

Figure 2:
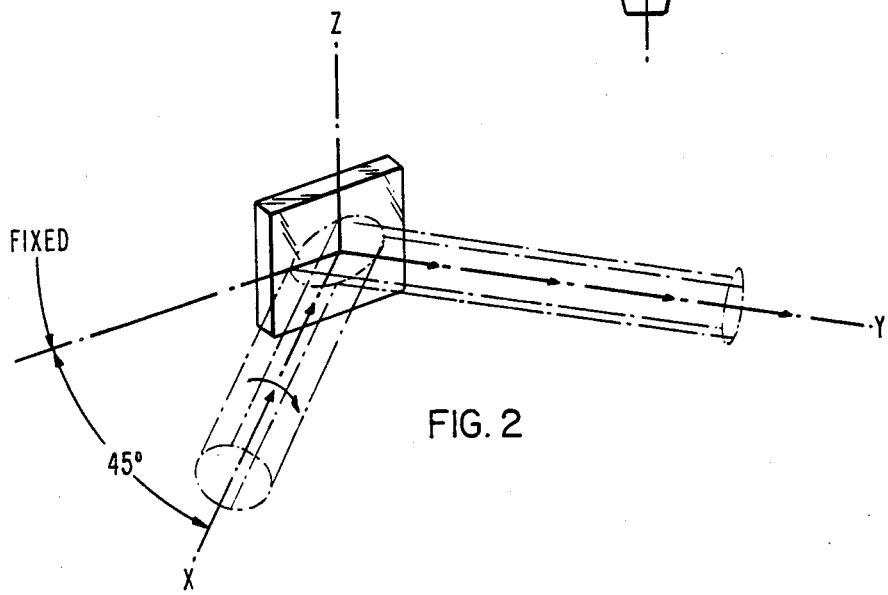
FIG. 2 is an A-B axis wrist type system schematically represented.

The two-axis optical wrist of this invention permits the laser beam to be truly manageable for 360° rotation at roll axis. This is because the laser beam lies on the center line of the rotational axis with the mechanical power system surrounding it. This results in the hollow wrist design of this invention. The laser beam-mechanical power coincident axis concept of this invention provides an optical wrist which can be used in a variety of applications. An attempt to further define the coincident axis concept can be seen in FIG. 2. For the sake of clarity, all coordinant systems referred to are by definition rectangular although the concept can obviously be used utilizing other conventional systems. A coordinant system is assumed to lie on the axis of the raw beam which is to be bent or turned in a mechanical power system either servo or manual which is used to manipulate the bend mirror which will turn or bend the raw beam is located at the origin. An AB type optical joint is shown in FIG. 2. This coordinant system has the beam traveling toward the origin on one axis indicated as the X-axis, the bend mirror is fixed at 45° from the plane (Y-Z), and the mechanical bend mirror rotating system will force mirror rotation about the incoming raw beam axis X which results in the raw beam out always lying in the perpendicular plane Y-Z. For the use of this design, only one bend mirror per joint is needed. Knuckle joints consisting of several mirrors are thus eliminated. This optical wrist maintains a 1:1 mechanical to optic motion relationship. Because of this relationship, the optical beam lies on the center line of the rotational axes with the mechanical power system surrounding it. The laser beam is therefore truly manageable for rotation at roll axes.

Figure 3:
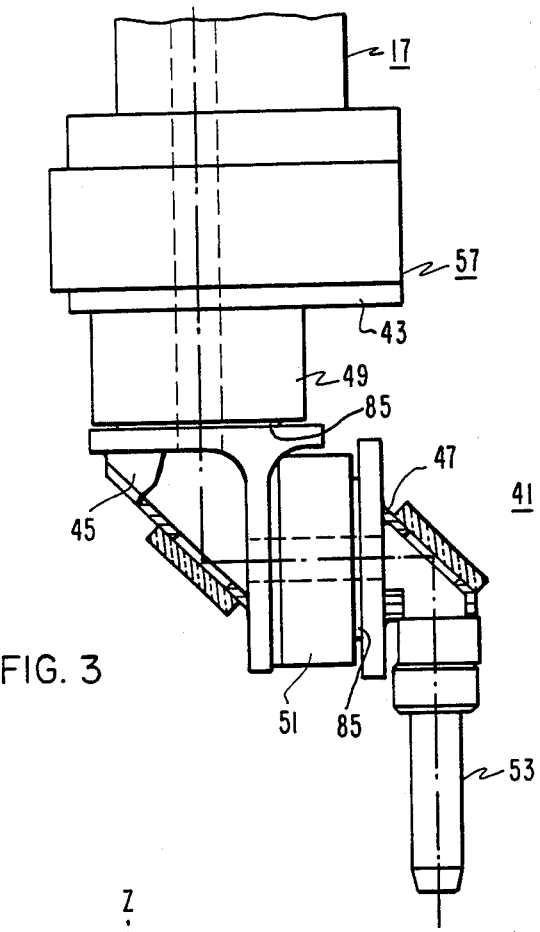
FIG. 3 is an elevational view of the two-axis optical wrist of this invention.
Figure 4:
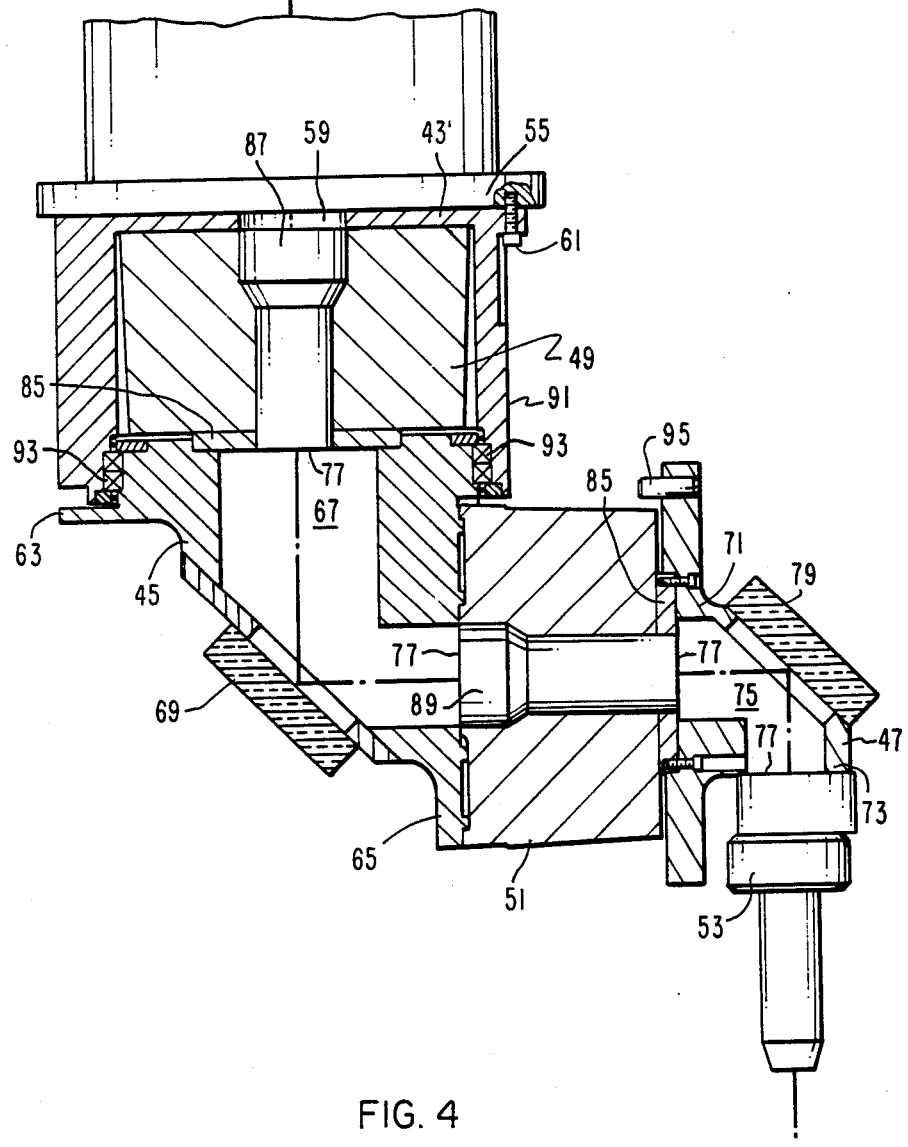
FIG. 4 is an elevated sectional view of the two-axis optical wrist in a modified configuration, according to the teachings of this invention.

The optical wrist incorporating the unique features identified above is illustrated in an elevational view in FIG. 3 and in an elevational sectional view in FIG. 4. Generally, the optical wrist 41 includes a mounting bracket 43, a first mirror housing 45, a second mirror housing 47, a first motor means 49, a second motor means 51 and a laser beam focussing assembly 53 which is removably mounted to the second mirror housing. The embodiments illustrated in FIGS. 3 and 4 are substantially identical with the exception of the mounting bracket 43 of FIG. 3 and 43' of FIG. 4 as will be described hereinafter.

The mounting bracket 43 (or 43') is adapted to be mounted onto the terminal portion of the laser beam delivery system as at 57 (FIG. 1) and supported by the X-axis by means of a bracket means 55 (FIG. 1). The mounting bracket 43 has an aperture 59 therethrough and includes means as at 61 for removably securing the mounting bracket to the terminal end 57 of the laser beam delivery system. The laser beam being directed through the laser beam delivery system 17 passes through the aperture 59. The first mirror housing means 45 has a first mounting face 63 and a second mounting face 65 which is substantially perpendicular to the first mounting face 63. There is defined by the first mirror housing 45 a chamber 67 in open communication through the first and second mounting faces 63 and 65, respectively. A reflective surface such as a mirror means 69 is disposed within the chamber 67. Reference is had to FIG. 2 for the disposition of the mirror means 69 with respect to the X-axis identified in FIG. 3. The second mirror housing means 47 has a first mounting face 71 and a second mounting face 73 which is substantially perpendicular to the first mounting face 71. There is defined within the second mirror housing 47 a chamber 75 which is in open communication with the first and second mounting faces 71 and 73. Each of the mounting faces of the first and second mirror housings 45 and 47 have an aperture therein identified by the reference character 77. The chamber 75 of the mirror housing 47 includes a reflective surface such as a mirror means 79 disposed therein and positioned so as to be substantially in line with the reflective mirror means 69 of the first housing 45. As indicated above, the geometry of the placement of the mirror means 79 can be appreciated through consideration of the representation in FIG. 2.

First and second motive means 49 and 51 respectively each have an inner stator 81, an outer stator 83 and an annular rotor 85 which is coaxially positioned between the inner and the outer stators 81 and 83, respectively about an axis of revolution, which axis of motion is coincident with the beam being conveyed therethrough. The first motor means 49 defines therein a conduit 87 through which the laser beam passes. The inner and outer stator means 81 and 83 are in a mechanically fixed association with the mounting bracket 43. The rotor means 85 is mounted in a mechanically fixed relationship with the first mirror housing 45 first mounting face 63.

The second motor means 51 defines a conduit 89 through which the beam passes. The inner and outer stators 81 and 83 are in a fixed mechanical association with the first mirror housing 45 second face 65. The rotor is in a fixed mechanical association with the second mirror housing 47, first mounting face 71. A suitable motor for use in the particular application described herein is available from Motornetics Corporation of Santa Rosa, Calif. The construction and operation of this high torque motor are described in U.S. Pat. Nos. 4,458,168, 4,481,453 and 4,501,980 which documents are incorporated herein by reference as fully set forth.

The mounting bracket 43' of FIG. 4 includes a housing portion 91 extending substantially perpendicular therefrom and onto which is rotatably supported the first mirror housing 45 by means of bearing means 93. The second mirror housing 47 can include therewith a mechanical stop means 95 which restricts rotation of the second mirror housing 47 and ultimately the laser beam focussing assembly to a safe work area. Such a mechanical stop prevents the accidental infliction of damage to the supporting industrial manipulator and laser beam delivery system as seen in FIG. 1. According to the configuration described above, rotation of either motor means 49 or 51 about its axis of motion causes the beam reflected by the reflective surface of the mirror housing associated with that particular motor's rotor to pass at an angle of 90° relative to the originating beam. This reflected beam describes a generally flat surface to which the axis of rotation of the motor means is perpendicular. (Note FIG. 2.)

What has been described is a two-axis optic wrist for laser applications suitable for use in combination with an industrial manipulator having associated therewith a laser beam delivery system.

We claim:

1. A two-axis optical wrist comprising:
   (A) a mounting bracket having an aperture therethrough including means for removably securing said mounting bracket to the terminal end of a laser beam delivery system and through which aperture the beam passes;
   (B) a first and a second mirror housing, each mirror housing having a first mounting face with an aperture therethrough and a second mounting face with an aperture therethrough perpendicular to said first mounting face, and defining therein a chamber in open communication through said first and second mounting face apertures and a reflective surface disposed within said chamber;
   (C) a first and a second motor means each having an inner stator, an outer stator and an annular rotor which is coaxially positioned between the inner and outer stators about an axis of revolution, which axis of revolution is coincident with the beam being conveyed therethrough;
      (a) said first motor means defining a conduit through which the beam passes the inner and outer stator means being in a mechanically fixed association with said mounting bracket and the rotor means being in a mechanically fixed relationship with said first mirror housing first mounting face,
      (b) said second motor means defining a conduit through which the beam passes, the inner and outer stator being in a mechanically fixed association with said first mirror housing second face and the rotor being in a fixed mechanical association with the second mirror housing first mounting face;
   (D) a laser beam focussing assembly removably mounted on the second mirror housing second face;
   wherein rotation of either motor means about its axis of motion causes the beam reflected by the reflective surface of the mirror housing associated with the rotor thereof passes at an angle of 90° to the originating beam and describes a generally flat surface to which the axis of rotation of the motor means is perpendicular.

2. In combination with a robotic system including an integral laser beam delivery system, said robotic system having one or more mechanical joints defining at least in part a first axis of motion and a second axis of motion, which axes of motion define a contoured path through the robotic system's geometric range of motion, wherein each of said mechanical joints defines in part a frame member; an integral laser beam delivery system for the delivery of a beam along any point within said geometric range of motion comprising:
   an optical joint having a housing with a reflective surface disposed therein mounted on the frame member of each said mechanical joint so as to be in synchronous association with each said mechanical joint;
   a tubular member disposed between adjacent optical joints and through which tubular member the beam passes as it travels from optical joint to optical joint, Said tubular member being attached between the frame members of each mechanical joint with which said adjacent optical joint is in synchronous association, wherein said reflective surface establishes a constant geometric relation between a segment of the beam impinging on said reflective surface and the axis of motion associated with said mechanical joint whereby the optical joints along with the tubular members disposed therebetween in each axis of motion are synchronous and incapable of mutual interference;
   the improvement comprising: a two-axis optical wrist comprising:
   (A) a mounting bracket having an aperture therethrough including means for removably securing said mounting bracket to the terminal end of a laser beam delivery system and through which aperture the beam passes;
   (B) a first and a second mirror housing, each mirror housing having a first mounting face with an aperture therethrough and a second mounting face with an aperture therethrough perpendicular to said first mounting face, and defining therein a chamber in open communication through said first and second mounting face apertures and a reflective surface disposed within said chamber;
   (C) a first and a second motor means each having an inner stator, an outer stator and an annular rotor which is coaxially positioned between the inner and outer stators about an axis of revolution, which axis of revolution is coincident with the beam being conveyed therethrough;
      (a) said first motor means defining a conduit through which the beam passes the inner and outer stator means being in a mechanically fixed association with said mounting bracket and the rotor means being in a mechanically fixed relationship with said first mirror housing first mounting face,
      (b) said second motor means defining a conduit through which the beam passes, the inner and outer stator being in a mechanically fixed association with said first mirror housing second face and the rotor being in a fixed mechanical association with the second mirror housing first mounting face;
   (D) a laser beam focussing assembly removably mounted on the second mirror housing second face;
   wherein rotation of either motor means about its axis of motion causes the beam reflected by the reflective surface of the mirror housing associated with the rotor thereof passes at an angle of 90° to the originating beam and describes a generally flat surface to which the axis of rotation of the motor means is perpendicular.

* * * * *